_United States Patent_ [19]

Mouri

[11] Patent Number: 5,267,629
[45] Date of Patent: Dec. 7, 1993

[54] AUXILIARY STEERING SYSTEM FOR A VEHICLE

[75] Inventor: Hiroshi Mouri, Yokosuka, Japan

[73] Assignee: Nissan Motor Co., Ltd., Yokohama, Japan

[21] Appl. No.: 890,797

[22] Filed: Jun. 1, 1992

[30] Foreign Application Priority Data

Jun. 14, 1991 [JP] Japan ................................ 3-169095

[51] Int. Cl.⁵ .............................................. B62D 5/06
[52] U.S. Cl. ................................. 180/142; 364/424.05
[58] Field of Search .............. 180/140, 141, 142, 79.1; 364/424.05

[56] References Cited

U.S. PATENT DOCUMENTS 4,757,869 7/1988 Morishita et al. .................. 180/79.1

FOREIGN PATENT DOCUMENTS 63-251374 10/1988 Japan .

Primary Examiner—Margaret A. Focarino
Assistant Examiner—Florian Zeender
Attorney, Agent, or Firm—Foley & Lardner

[57] ABSTRACT

An auxiliary steering system for a vehicle is adapted to additionally steer the front wheels and/or rear wheels of a vehicle upon the main steering of the front wheels by a steering maneuver of a steering wheel, while an auxiliary steer angle is determined in accordance with a differential value of a main steer angle of the front wheels. An auxiliary steering system further includes a limiter means adapted to restrict an upper limit of the differential value in accordance with a main steer speed or in accordance with both of the main steer speed and the main steer angle, whereby the auxiliary steer angle does not become too large and a jerk of the vehicle is prevented even if the main steer speed is high, while within a large main steer angle range the auxiliary steer angle is not suppressed and remains capable of compensating for a lowering of a tire cornering power.

4 Claims, 4 Drawing Sheets

FIG_3a
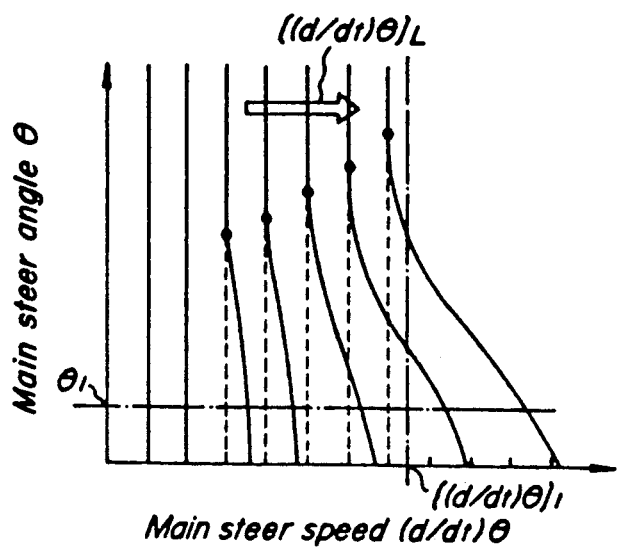
FIG_3b
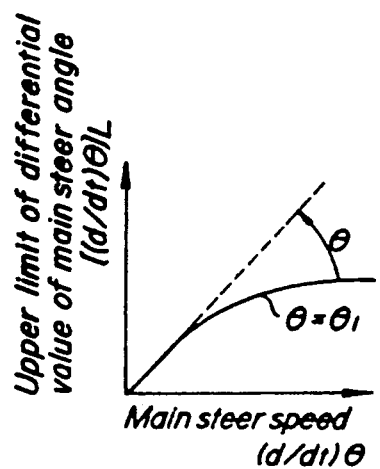
FIG_3c
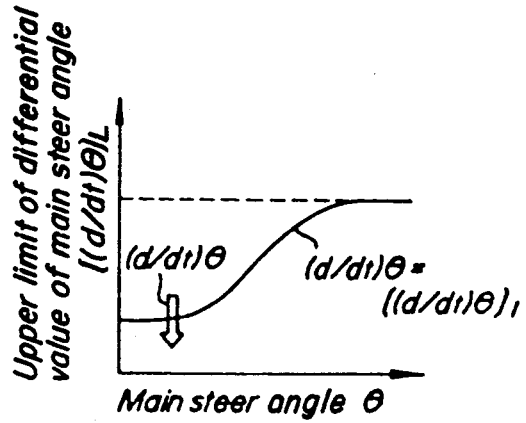

AUXILIARY STEERING SYSTEM FOR A VEHICLE

BACKGROUND OF THE INVENTION

1. Field of the Invention

The present invention relates to an auxiliary steering system for a vehicle, suitably used for improving a vehicle's dynamic performance.

2. Description of the Related Art

An auxiliary steering system is usually designed to steer front wheels and/or rear wheels of the vehicle in addition to main steering of the front wheels by a steering maneuver of a steering wheel, whereby a vehicle's dynamic performance is improved in a desired manner.

A typical example of a conventional auxiliary steering system for a vehicle is disclosed, for instance, in Japanese Patent Application Laid-Open Publication No. 63-251374. In the disclosed auxiliary steering system, auxiliary steer angles of front wheels and rear wheels $\delta_f$, $\delta_r$ are calculated from the following equations respectively.

$$\delta_f = K_f \theta + T_f (d/dt)\theta \tag{1}$$

$$\delta_r = K_r \theta + T_r (d/dt)\theta \tag{2}$$

Symbols
$\theta$: steering maneuver angle
$K_f$: proportional coefficient
$K_r$: proportional coefficient
$T_f$: differential coefficient
$T_r$: differential coefficient According to the disclosed auxiliary steering system, in which the auxiliary steer angles of the front wheels and rear wheels $\delta_f$, $\delta_r$ are given as the above-mentioned equations (1) and (2) upon main steering of the front wheels by means of a steering wheel, the following desired behavior of a vehicle would be expected. That is, at the beginning of a steering maneuver of the steering wheel, the steering maneuver angle $\theta$ is relatively small and on the contrary, a rate of change (speed) thereof $(d/dt)\theta$ is relatively high, so that the second item on the right side in each equation, (1) and (2), i.e., $T_f(d/dt)\theta$ and $T_r(d/dt)\theta$ is effectively more than the first item on the right side in each equation, i.e., $K_f\theta$ and $K_r\theta$ and thus an initial turning characteristic of the vehicle is advantageously enhanced. Thereafter, at the end of the steering maneuver of the steering wheel, the steering maneuver angle $\theta$ is relatively large and, on the contrary, a rate of change (speed) thereof $(d/dt)\theta$ is relatively low, so that the first item on the right side in each equation, (1) and (2), i.e., $K_f\theta$ and $K_r\theta$ is effectively more than the second item on the right side in each equation, i.e., $T_f(d/dt)\theta$ and $T_r(d/dt)\theta$ and thus a steering stability of the vehicle is advantageously enhanced.

However, in the conventional auxiliary steering system which is adapted to determine the auxiliary steer angles $\delta f$, $\delta r$ on the basis of the differential value $(d/dt)\theta$ of the main steer angle $\theta$, because the auxiliary steer angles of the front wheels and rear wheels $\delta f$, $\delta r$ are calculated respectively by making use of the differential value $(d/dt)\theta$ of the main steer angle $\theta$ of the front wheels (main steer speed) as it is, that is, an upper limit of the differential value $[(d/dt)\theta]L$ is not essentially restricted and is usually equal to the differential value $(d/dt)\theta$ as can be seen in FIG. 4, so that the following problems tend to occur. That is, in order to achieve a desired initial turning characteristic of the vehicle the differential coefficients Tf and Tr must be considerably large, but because of such large differential coefficients, if the differential value of the main steer angle is large, an auxiliary steering causes the turning of the vehicle to be suddenly increased and thereafter this auxiliary steering disappears immediately. This causes the vehicle during turning to be jerked and not capable of tracing an aimed line because of its too sensitive behavior. This further causes a discontinuous change of vehicle behavior during a change of main steer speed, which gives to a driver of the the vehicle an unexpected driving feel.

SUMMARY OF THE INVENTION

Therefore, it is an object of the present invention to solve the problems in the prior art.

Another object of the present invention is to provide an improvement to an auxiliary steering system for a vehicle to make it possible to prevent an auxiliary steer angle from becoming too large upon a high-speed main steering, which auxiliary steer angle is determined on the basis of a differential value of a main steer angle.

A further object of the present invention is to provide an auxiliary steering system for a vehicle in which an upper limit of a differential value of a main steer angle is determined in accordance with a main steer speed.

A further object of the present invention is to provide an auxiliary steering system for a vehicle in which an upper limit of a differential value of a main steer angle is determined in accordance with both a main steer speed and a main steer angle because the above-mentioned problems in the prior art usually occur in the region of small main steer angle and then in the region of large main steer angle and enough auxiliary steer is needed in order to compensate a tire cornering power which is lowered in the region of large main steer angle and to advantageously enhance a turning characteristic of a vehicle.

In order to accomplish the above-mentioned and other objects, it is one aspect of the present invention to provide an auxiliary steering system for additionally steering front wheels and/or rear wheels of a vehicle upon main steering of the front wheels by a steering maneuver of a steering wheel, an auxiliary steer angle of the front wheels and/or rear wheels to be steered in addition to said main steering of the front wheels being determined on the basis of a differential value of a main steer angle of the front wheels, comprising:

a limiter adapted to restrict an upper limit of said differential value of the main steer angle of the front wheels in accordance with a main steer speed of the front wheels or in accordance with both of the main steer speed and the main steer angle of the front wheels.

According to another aspect of the invention, it is preferable that said differential value is a first order differential value of the main steer angle of the front wheels.

According to a further aspect of the invention, it is preferable that a relation between said upper limit of the differential value and said main steer speed is predetermined in such a manner that the upper limit of the differential value is more restricted as the main steer speed becomes higher.

According to a still further aspect of the invention, it is preferable that a relation between the upper limit of the differential value and the main steer angle is predetermined in such a manner that the upper limit of the differential value is more restricted as the main steer angle becomes smaller.

BRIEF DESCRIPTION OF THE DRAWINGS

FIG. 3a shows an example of an upper limit of a differential value of a main steer angle, which upper limit is predetermined in combination of a main steer extent and a main steer speed and is used by a calculation of an auxiliary steer angle;

FIG. 3b shows the upper limit in FIG. 3a in the different form, i.e., as a characteristic to a main steer speed when a steering maneuver angle $\theta$ (main steer angle) is $\theta_1$;

FIG. 3c shows the upper limit of FIG. 3a in another different form, i.e., as a characteristic of a main steer angle when a steering maneuver speed $(d/dt)\theta$ (main steer speed) is $[(d/dt)\theta]1$.

DESCRIPTION OF THE PREFERRED EMBODIMENTS

Figure 1:
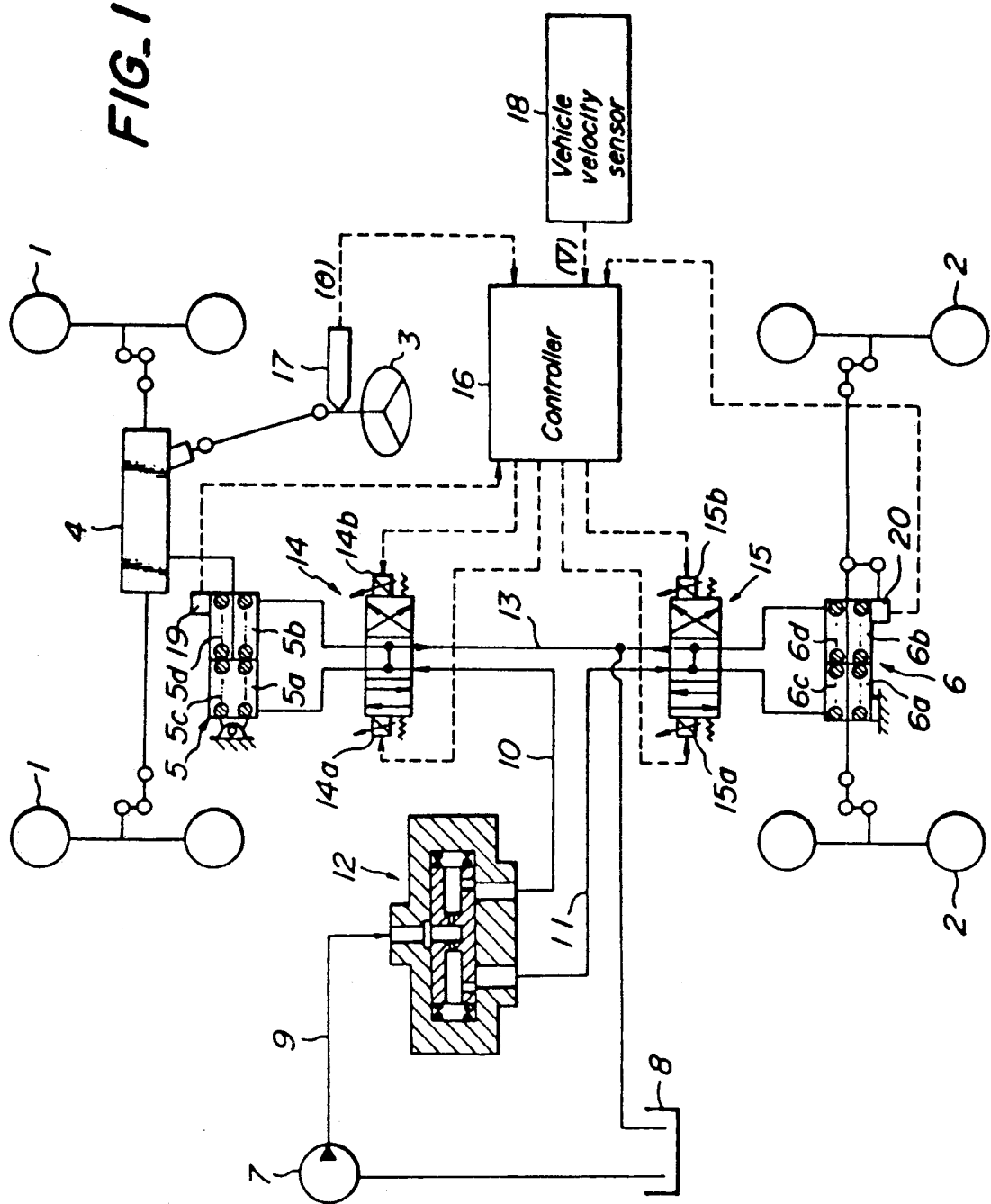
FIG. 1 shows in diagrammatic form a steering system of a vehicle including an embodiment of an auxiliary steering system according to the present invention.

Referring now to the drawings, FIG. 1 shows a steering system of a vehicle including a preferred embodiment of an auxiliary steering system according to the present invention and a usual main steering system adapted to steer front wheels by a steering maneuver of a steering wheel.

In FIG. 1, 1 represents each of the front wheels and 2 represents each of the rear wheels. The left and right front wheels 1 are connected to a steering wheel 3 in the usual manner through a steering gear box 4 respectively so that the front wheels 1 can be steered through the steering gear box 4 by a steering maneuver of the steering wheel 3.

The front wheels 1 are also able to be steered by an actuator cylinder 5, which auxiliary steering of the front wheels 1 is executed in addition to the main steering through the gear box 4 by means of the steering wheel 3. For this auxiliary steering of the front wheels 1, the actuator cylinder 5 is arranged laterally to a vehicle body and a cylinder body which is pivoted to the vehicle body and a piston rod of which is coupled with a housing of the steering gear box 4. The actuator cylinder 5 has a pair of hydraulic chambers 5a and 5b on either side of a piston which is coupled to the piston rod, and a pair of centering springs 5c and 5d which resiliently hold the piston in its neutral position where an auxiliary steer angle of the front wheels 1 is maintained at zero.

The left and right rear wheels 2 are able to be steered by an actuator cylinder 6. For this auxiliary steering of the rear wheels 2, the actuator cylinder 6 is arranged laterally the vehicle body, a cylinder body of which is fixed to the vehicle body and a piston rod of which is articulated at its opposite extending ends to the rear wheels 2. The actuator cylinder 6 has a pair of hydraulic chambers 6a and 6b on either side of a piston to which the piston rod is fixed, and a pair of centering springs 6c and 6d which resiliently hold the piston in its neutral position where an auxiliary steer angle of the rear wheels 2 is maintained at zero.

The auxiliary steerings of the front wheels and rear wheels are electronically controlled as will be described hereafter and a control system therefor is constructed as follows.

There is provided an oil pump 7 as a hydraulic source which feeds oil from an oil reservoir 8 to a main conduit 9. The oil in the main conduit 9 is then delivered to a distributing valve 12 and is distributed into two auxiliary steering lines 10 and 11 thereby, one of which lines 10 is for the auxiliary steering of the front wheels 1 and the other line 11 is for the auxiliary steering of the rear wheels 2. The oil in the lines 10 and 11 is conveniently applied to the auxiliary steerings of the relevant front and rear wheels, and the oil after this application is returned to the oil reserve 8 through a drain line 13.

There are further provided an auxiliary steer angle control valve 14 for the front wheels 1 and an auxiliary steer angle control valve 15 for the rear wheels 2. The auxiliary steer angle control valve 14 is connected between the lines 10, 13 and the hydraulic chambers 5a, 5b of the actuator cylinder 5, while the auxiliary steer angle control valve 15 is connected between the lines 11, 13 and the hydraulic chambers 6a, 6b of the actuator cylinder 6.

The valve 14 has a pair of solenoids 14a and 14b which, when both are deenergized, provide a shown central valve position in which the valve 14 drains all volume of the oil from the line 10 and returns it to the reserve 8 through the line 13 to maintain the hydraulic chambers 5a and 5b atmospheric pressure. In this case the actuator cylinder 5 is in its usual condition, the piston of which is occupied in its neutral position by the centering springs 5c and 5d to make an auxiliary steer angle of the front wheels 1 equal to zero.

When the solenoid 14a is energized, the valve 14 pressurizes the relevant hydraulic chamber 5a, a pressure in which is increased in proportion as an intensity of a current to the solenoid 14a is increased, while the valve 14 communicates the other hydraulic chamber 5b to the drain line 13. In this case the actuator cylinder 5 operates in its extending direction against the centering spring 5d by a distance in accordance with the pressure in the hydraulic chamber 5a to move the steering gear box 4 as a whole in the right direction on FIG. 1 by the same distance, whereby a corresponding auxiliary left steer angle is given to the front wheels 1 in addition to the main steer angle by means of the steering wheel 3.

When the solenoid 14b is energized alternatively, the valve 14 pressurizes the relevant hydraulic chamber 5b, a pressure in which is increased in proportion as an intensity of a current to the solenoid 14b is increased, while the valve 14 communicates the other hydraulic chamber 5a to the drain line 13. In this case the actuator cylinder 5 operates in its retracting direction against the centering spring 5c by a distance in accordance with the pressure in the hydraulic chamber 5b to move the steering gear box 4 as a whole in the left direction on FIG. 1 by the same distance, whereby a corresponding auxiliary right steer angle is given to the front wheels 1 in addition to the main steer angle by means of the steering wheel 3.

The valve 15 has a pair of solenoids 15a and 15b which, when both are deenergized, provide a shown central valve position in which the valve 15 drains all volume of the oil from the line 11 and returns it to the reserve 8 through the line 13 to maintain the hydraulic chambers 6a and 6b at atmospheric pressure. In this case the actuator cylinder 5 is in its usual condition, the piston of which is occupied in its neutral position by the centering springs 6c and 6d to make an auxiliary steer angle of the rear wheels 2 equal to zero.

When the solenoid 15a is energized, the valve 15 pressurizes the relevant hydraulic chamber 6a, a pressure in which is increased in proportion as an intensity of a current to the solenoid 15a is increased, while the valve 15 communicates the other hydraulic chamber 6b to the drain line 13. In this case the piston rod of the actuator cylinder 6 is displaced in the right direction on FIG. 1 against the centering spring 6d by a distance in accordance with the pressure in the hydraulic chamber 6a to give a corresponding auxiliary right steer angle to the rear wheels 2.

When the solenoid 15b is energized, the valve 15 pressurizes the relevant hydraulic chamber 6b, a pressure in which is increased in proportion as an intensity of a current to the solenoid 15b is increased, while the valve 15 communicates the other hydraulic chamber 6a to the drain line 13. In this case the piston rod of the actuator cylinder 6 is displaced in the left direction on FIG. 1 against the centering spring 6c by a distance in accordance with the pressure in the hydraulic chamber 6b to give a corresponding auxiliary left steer angle to the rear wheels 2.

The solenoids 14a, 14b, 15a and 15b are electronically controlled by a common controller 16 which may be a microcomputer. In connection with this controller 16 there are provided a plurality of sensors 17 to 20. The first sensor 17 is a steering angle sensor for detecting a steering maneuver angle $\theta$ of the steering wheel 3 (corresponding to a main steer angle of the front wheels 1), and the second sensor 18 is a vehicle velocity sensor for detecting a vehicle velocity V. Moreover, the third and fourth sensors 19 and 20 are potentiometers respectively, of which the potentiometer 19 is adapted to detect a position of the piston rod of the actuator cylinder 5 for front-wheel auxiliary steering (corresponding to an auxiliary steer angle of the front wheels 1) and the potentiometer 20 is adapted to detect a position of the piston rod of the actuator cylinder 6 for rear-wheel auxiliary steering (corresponding to an auxiliary steer angle of the rear wheels 2). The above-mentioned information from the sensors 17 to 20 are delivered to the controller 16.

The controller 16 calculates a desired front-wheel auxiliary steer angle and a desired rear-wheel auxiliary steer angle in accordance with the steering maneuver angle $\theta$ detected by the sensor 17 and the vehicle velocity V detected by the sensor 18, as will be described hereafter respectively. The controller 16, thereafter, compares such desired auxiliary steer angles of the front and rear wheels with the corresponding actual auxiliary steer angles of the front and rear wheels detected by the sensors 19 and 20, and then the controller 16 selects the solenoids 14a or 14b and 15a or 15b and supplies to each of the selected solenoids a given intensity of current corresponding to a difference between the actual auxiliary steer angle and the desired auxiliary steer angle in such a manner that the actual auxiliary steer angles of the front and rear wheels are brought to the desired auxiliary steer angles of the front and rear wheels respectively.

Figure 2:
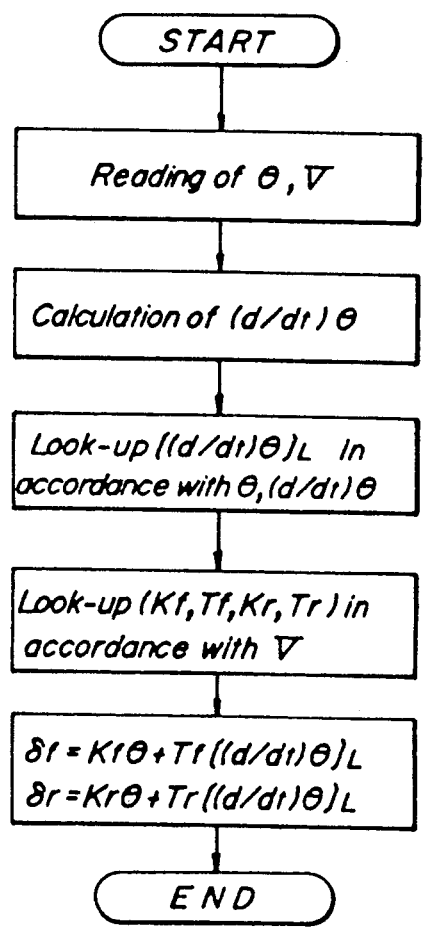
FIG. 2 shows a control program to be executed by a controller in the auxiliary steering system shown in FIG. 1.

The desired auxiliary steer angles for the front and rear wheels $\delta_f$, $\delta_r$ may be determined as follows by the controller 16 which executes a control program as shown in FIG. 2. In the shown control program the controller 16 first reads the steering maneuver angle $\theta$ detected by the sensor 17 and the vehicle velocity V detected by the sensor 18. At the next step in the shown control program, the main steer speed $(d/dt)\theta$ is calculated by differentiating the steering maneuver angle $\theta$. At the following step the controller 16 looks up an upper limit $[(d/dt)\theta]L$ of a differential value $(d/dt)\theta$ of the steering maneuver angle $\theta$ in a given table of data corresponding to FIG. 3a in accordance with a combination of the steering maneuver angle $\theta$ and the differential value $(d/dt)\theta$ thereof.

As shown by solid lines in FIG. 3a, the upper limit $[(d/dt)\theta]L$ is predetermined by a combination of the steering maneuver angle $\theta$ and the differential value $(d/dt)\theta$ thereof, and the same upper limit $[(d/dt)\theta]L$ exists on the same solid line, while the upper limit increases to the right in FIG. 3a. For ease of understanding, there is shown by a in FIG. 3b the upper limit in FIG. 3a as a characteristic of the differential value $(d/dt)\theta$ (main steer speed) when a steering maneuver angle $\theta$ (main steer angle) is $\theta_1$, and there is shown by a solid line in FIG. 3c the upper limit in FIG. 3a as a characteristic the steering maneuver angle $\theta$ when the steering maneuver speed $(d/dt)\theta$ (main steer speed) is $[(d/dt)\theta]1$.

Figure 4:
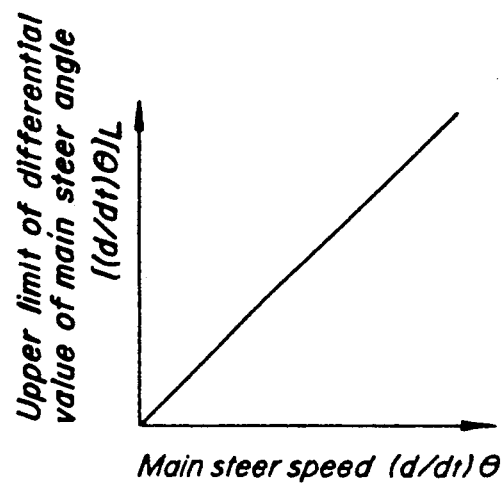
FIG. 4 shows an upper limit of a differential value of a main steer angle, which is used for calculating an auxiliary steer angle in a conventional auxiliary steering system and is usually equal to a differential value of a main steer angle.

As can be appreciated from FIG. 3b, the upper limit $[(d/dt)\theta]L$ is predetermined to be more restricted and thus to be more remote from a dotted-line characteristic of the prior art (corresponding to FIG. 4 in which the upper limit is not restricted at all) as the main steer speed becomes higher. The reason for such predetermination of the upper limit is that the auxiliary steer angle becomes too large and thus the foregoing problems described with respect to the prior art tend to occur as the main steer speed becomes higher.

As can be appreciated from FIG. 3c, the upper limit $[(d/dt)\theta]L$ also predetermined to be changed in accordance with the steering maneuver angle $\theta$ (main steer angle), where the upper limit is more restricted and thus more remote from a dotted-line characteristic of the prior art as the main steer becomes smaller. This tendency of the upper limit can also be seen in FIG. 3b in which the solid-line characteristic approaches the dotted-line characteristic as shown by an arrow as the main steer angle $\theta$ becomes larger. The reason for such predetermination of the upper limit is that the foregoing problems described with respect to the prior art tend to occur when the the main steer angle $\theta$ is near zero, while within a large main steer angle range it is preferred that the auxiliary steer angle in accordance with the differential value $(d/dt)\theta$ is larger as the main steer angle $\theta$ becomes larger in order to compensate for a lowering of a tire cornering power.

In FIG. 2, at the next step the controller 16 looks up each of the proportional coefficients $K_f$ and $K_r$ and each of the differential coefficients $T_f$ and $T_r$ in accordance with the vehicle velocity V in the usual manner. Thereafter, at the last step the desired auxiliary steer angles for the front wheels and rear wheels $\delta_f$ and $\delta_r$ are calculated with the following equations.

$$\delta_f = K_f \theta + T_f[(d/dt)\theta]L \qquad (3)$$

$$\delta_r = K_r \theta + T_r[(d/dt)\theta]L \qquad (4)$$

These equations are established by replacing $(d/dt)\theta$ in the foregoing equations (1) and (2) with $[(d/dt)\theta]L$ respectively. According to such a determination of the desired auxiliary steer angles $\delta_f$ and $\delta_r$, because the differential value $(d/dt)\theta$ of the main steer angle $\theta$ is not used as it is, but the above-mentioned upper limit thereof $[(d/dt)\theta]L$ according to the main steer speed is used alternatively, the second item on the right side in each of the equations (3) and (4) does not become too large even if the main steer speed is high, and thus the preferred embodiment is capable of resolving all of the foregoing problems caused in the prior art during high-speed main steering; the first problem being that the vehicle in turning is jerked and is not capable of tracing an aimed line during high-speed main steering; and the second problem being that a change of vehicle behavior during a change of main steer speed is made discontinuous during high-speed main steering.

The foregoing preferred embodiment, furthermore, provides the following benefit because the upper limit $[(d/dt)\theta]L$ is also changed in accordance with the main steer angle $\theta$ as follows. Within a large main steer angle range the upper limit $[(d/dt)\theta]L$ is not restricted to be equal to the differential value $(d/dt)\theta$ and the auxiliary steer angle in accordance with the upper limit $[(d/dt)\theta]L$ becomes larger within the large main steer angle range than within a small main steer angle range so as to compensate for the lowering of the tire cornering power caused by the large main steering. Within the small main steer angle range, however, the upper limit $[(d/dt)\theta]L$ is restricted as set forth heretofore and the foregoing function during the high-speed main steering may be surely achieved, which high-speed main steering is performed usually within the small main steer angle range.

The foregoing embodiment is a preferred example of an auxiliary steering system for a vehicle according to the invention. The invention is not limited to the foregoing embodiment and various modifications can be made to the invention. For instance, if an auxiliary steer angle is calculated with an equation including not only a first order differential item relative to the main steer angle $\theta$ as in the foregoing embodiment, but also a multi-order differential item such as second order and a third order differential items, multi-order differential value may also be restricted in the same manner as the first differential value.

Furthermore, the steering response required in a usual driving condition would be only 2Hz of steering frequency at most, within ±30 degrees of steering maneuver angle $\theta$, and the higher frequency components tend to result in unexpected driving feel such as the jerk of the vehicle. For the above, the upper limit of the differential value is preferably predetermined to be about 377 deg/sec ($2\pi \times 2 \times 30 = 377$ deg/sec) and to be lower within a small main steer angle range near the neutral steering position.

What is claimed is:

1. An auxiliary steering system for additionally steering front wheels and/or rear wheels of a vehicle upon main steering of the front wheels by steering maneuver of a steering wheel, an auxiliary steer angle of the front wheels and/or rear wheels to be steered in addition to said main steering of the front wheels being determined on the basis of a differential value of a main steer angle of the front wheels, comprising:
    a limiter for restricting an upper limit of said differential value of the main steer angle of the front wheels as a first order differential value of the main steer angle of the front wheels increases.

2. An auxiliary steering system for a vehicle as set forth in claim 1, wherein said differential value is a first order differential value of the main steer angle of the front wheels.

3. An auxiliary steering system for additionally steering front wheels and/or rear wheels of a vehicle upon main steering of the front wheels by steering maneuver of a steering wheel, an auxiliary steer angle of the front wheels and/or rear wheels to be steered in addition to said main steering of the front wheels being determined on the basis of a differential value of a main steer angle of the front wheels, comprising:
    a limiter for restricting an upper limit of said differential value of the main steer angle of the front wheels as a first order differential value of the main steer angle of the front wheels becomes higher and the main steer angle of the front wheels decreases.

4. An auxiliary steering system for a vehicle as set forth in claim 3, wherein said differential value is a first order differential value of the main steer angle of the front wheels.

* * * * *